US007980742B2

(12) United States Patent
Albou

(10) Patent No.: US 7,980,742 B2
(45) Date of Patent: Jul. 19, 2011

(54) LIGHTING MODULE FOR A MOTOR VEHICLE HEADLIGHT

(75) Inventor: Pierre Albou, Paris (FR)

(73) Assignee: Valeo Vision, Bobigny (FR)

( * ) Notice: Subject to any disclaimer, the term of this patent is extended or adjusted under 35 U.S.C. 154(b) by 372 days.

(21) Appl. No.: 12/178,825

(22) Filed: Jul. 24, 2008

(65) Prior Publication Data

US 2009/0027909 A1 Jan. 29, 2009

(30) Foreign Application Priority Data

Jul. 27, 2007 (FR) ...................................... 07 05535

(51) Int. Cl.
*B60Q 1/00* (2006.01)
*F21V 7/00* (2006.01)

(52) U.S. Cl. ........ 362/518; 362/517; 362/520; 362/538; 362/545

(58) Field of Classification Search .................. 362/517, 362/538, 520, 545, 518
See application file for complete search history.

(56) References Cited

U.S. PATENT DOCUMENTS

| | | | | |
|---|---|---|---|---|
| 6,811,289 | B2 | 11/2004 | Nakata | |
| 7,121,705 | B2 | 10/2006 | Albou et al. | |
| 7,168,836 | B2 | 1/2007 | Tatsukawa | |
| 7,390,112 | B2 | 6/2008 | Leleve | |
| 7,524,095 | B2 | 4/2009 | Albou et al. | |
| 7,699,509 | B2 | 4/2010 | Leleve | |
| 2002/0145370 | A1 | 10/2002 | Nakata | |
| 2002/0186570 | A1 | 12/2002 | Albou et al. | |
| 2004/0264210 | A1 | 12/2004 | Albou et al. | |
| 2005/0018436 | A1 * | 1/2005 | Leleve | 362/464 |
| 2005/0219856 | A1 * | 10/2005 | Tatsukawa | 362/507 |
| 2006/0239022 | A1 | 10/2006 | Inaba et al. | |
| 2006/0285347 | A1 * | 12/2006 | Okada | 362/516 |

FOREIGN PATENT DOCUMENTS

| | | | |
|---|---|---|---|
| EP | 1225386 | A2 | 7/2002 |
| EP | 1243846 | | 9/2002 |
| EP | 1491816 | A1 | 12/2004 |
| EP | 1500553 | | 1/2005 |
| FR | 2868510 | A1 | 10/2005 |

* cited by examiner

*Primary Examiner* — Jason Moon Han
*Assistant Examiner* — Sean P Gramling
(74) *Attorney, Agent, or Firm* — Jacox, Meckstroth & Jenkins

(57) ABSTRACT

A lighting module for a motor vehicle headlight for giving a cutoff beam, having an optical axis and comprising at least one light source (S), a reflector (R, Ra, Ra1, Ra2) of the complex surface type, and a cylindrical lens (L, La) with substantially vertical generatrices placed between the two foci (F1, F2) of the arc of an ellipse. The light source consists of at least one light emitting diode disposed so that its light beam has a mean direction (Δ, Δa) substantially orthogonal to the geometric axis of the reflector (R, Ra, Ra1, Ra2), which is situated relative to the plane of the rear face of the light emitting diode, on the emitted beam side, and in calculating its surface area account is taken of the protective lens of the light emitting diode.

20 Claims, 3 Drawing Sheets

LIGHTING MODULE FOR A MOTOR VEHICLE HEADLIGHT

CROSS-REFERENCE TO RELATED APPLICATIONS

This application claims priority to French Application No. 0705535 filed Jul. 27, 2007, which application is incorporated herein by reference and made a part hereof.

FIELD OF THE INVENTION

The invention relates to a lighting module for a motor vehicle headlight for giving a cutoff beam, in particular a low beam.

DESCRIPTION OF THE RELATED ART

There is known, for example from the patent EP-A-1 491 816, which is equivalent to U.S. Pat. No. 7,121,705, which is incorporated herein by reference and made a part hereof, a module having an optical axis and comprising:

at least one light source, a reflector of the complex-surface type, the light source being disposed at a focus situated on the optical axis or in its vicinity, the reflector producing a cutoff beam towards the front, and a cylindrical lens with vertical generatrices placed between the two foci of the ellipse arc.

The patent EP-A-1 491 816 combined such a module with supplementary reflectors. Such a device is relatively bulky in the vertical direction so that, in order to produce a headlight with progressive bending illumination (PBL) it is scarcely possible to effect a vertical stacking of the modules and it is necessary to juxtapose them horizontally, which leads to wide assemblies.

SUMMARY OF THE INVENTION

The aim of the invention above all is to provide a lighting module with a relatively small bulk in the vertical direction, in particular to allow stacking in height of several modules.

The intention also aims to provide a high-efficiency lighting module, the energy consumption of which is reduced for the same light flux. It is also desirable for the beam produced by the module to be well spread in order to meet the requirements of specifications.

According to the invention, a lighting module is defined as follows: it is a lighting module for a motor vehicle headlight for giving a cutoff beam, in particular a low beam, this module having an optical axis and comprising:

at least one light source, a reflector of the complex-surface type, the light source being disposed at a focus situated on the optical axis or in its vicinity, and the cross section of the reflector through a horizontal plane being substantially in an arc of an ellipse having a first focus merged with, or in the vicinity of, the focus where the light source is situated, and a second focus situated in front on the optical axis of the module, the reflector producing a cutoff beam towards the front, and a cylindrical lens with substantially vertical generatrices placed between the two foci (F1, F2) of the arc of an ellipse, and such that the light source comprises at least one light emitting diode disposed so that its light beam has a mean direction substantially orthogonal to the geometric axis of the reflector, the reflector is situated, in relation to the plane of the rear face of the light emitting diode, on the emitted beam side, and its surface area is calculated by taking account of the protective optic part of the light emitting diode.

From this it is understood that the surface area of the reflector is calculated so that deviations (spherical caps of the LEDs with protective dome) or offsets (planar blades of the LEDs protected by blades) due to the protection of the rays issuing from the chosen light source are taken into account in an appropriate fashion.

Advantageously, the horizontal plane mentioned above is merged with or very close to the exit face of the diode emitter.

Advantageously again, the lens is roughly of the divergent type, although one or more areas of the lens may not be divergent.

"Complex surface" means a surface defined so as to create a cutoff by alignment of images in the absence of a cover or dish. It is also called "free surface" according to the state of the art in that field.

The light emitting diode preferably comprises a heat sink situated on the side opposite to the reflector.

The assembly makes it possible to obtain a broad emerging beam, with a sharp cutoff line, with a high output and reduced consumption.

The light emitting diode may be disposed with its rear face in a horizontal plane so as to emit a light beam downwards in a substantially vertical mean direction, the heat sink of the light emitting diode preferably being situated above this, while the reflector is situated below the horizontal plane of the rear face of the diode.

Alternatively, the light emitting diode may be disposed with its rear face in a horizontal plane so as to emit a light beam upwards in a substantially vertical mean direction, the heat sink of the light emitting diode preferably being situated below this, while the reflector is situated above the horizontal plane of the rear face of the diode.

Advantageously, the light emitting diode is exposed with its rear face in a substantially vertical plane so as to emit a light beam having a substantially horizontal mean direction, the heat sink of the light emitting diode preferably being situated behind this, while the reflector is situated in front of the light emitting diode turned downwards, and a return mirror is disposed below the reflector in order to return the beam towards the lens.

Alternatively, the light emitting diode is disposed with its rear face in a substantially vertical plane so as to emit a light beam having a substantially horizontal mean direction, the heat sink of the light emitting diode preferably being situated behind this, while the reflector is situated in front of the light emitting diode turned upwards, and a return mirror is disposed above the reflector in order to return the beam towards the lens.

The return mirror may be planar, and preferably inclined at approximately 45° to the horizontal plane. This angle may be modified where the plane of the diodes is not strictly vertical.

The invention also concerns a headlight equipped with at least one module as defined previously.

The headlight may comprise several modules with light emitting diode disposed with its rear face in a horizontal plane, the modules being juxtaposed with the rear faces of the light emitting diodes situated in the same horizontal plane.

The headlight may comprise several modules where the modules are juxtaposed or stacked with the rear faces of the light emitting diodes situated in the same plane.

The headlight preferably comprises several modules with light emitting diode disposed with its rear face in a vertical plane, and the modules are stacked so that the rear faces of the light emitting diodes are situated in the same vertical plane and on the same printed circuit board.

The modules, according to one embodiment, may be stacked and have beams offset angularly, in horizontal projection, from bottom to top, and be switched on successively according to the turning of the vehicle wheels in order to obtain progressive bending lighting (PBL, standing for progressive bending light in English).

The headlight can comprise three (or four) stacked modules and beams offset angularly.

Advantageously, the return mirror is disposed above or below the reflector of the bottom module and preferably forms a single piece with it.

The invention consists, apart from the provisions disclosed above, of a certain number of other provisions that will be dealt with more explicitly below with regard to example embodiments described with reference to the accompanying drawings but which are in no way limitative. In these drawings:

These and other objects and advantages of the invention will be apparent from the following description, the accompanying drawings and the appended claims.

BRIEF DESCRIPTION OF THE ACCOMPANYING DRAWINGS

DETAILED DESCRIPTION OF THE PREFERRED EMBODIMENTS

Figure 1:
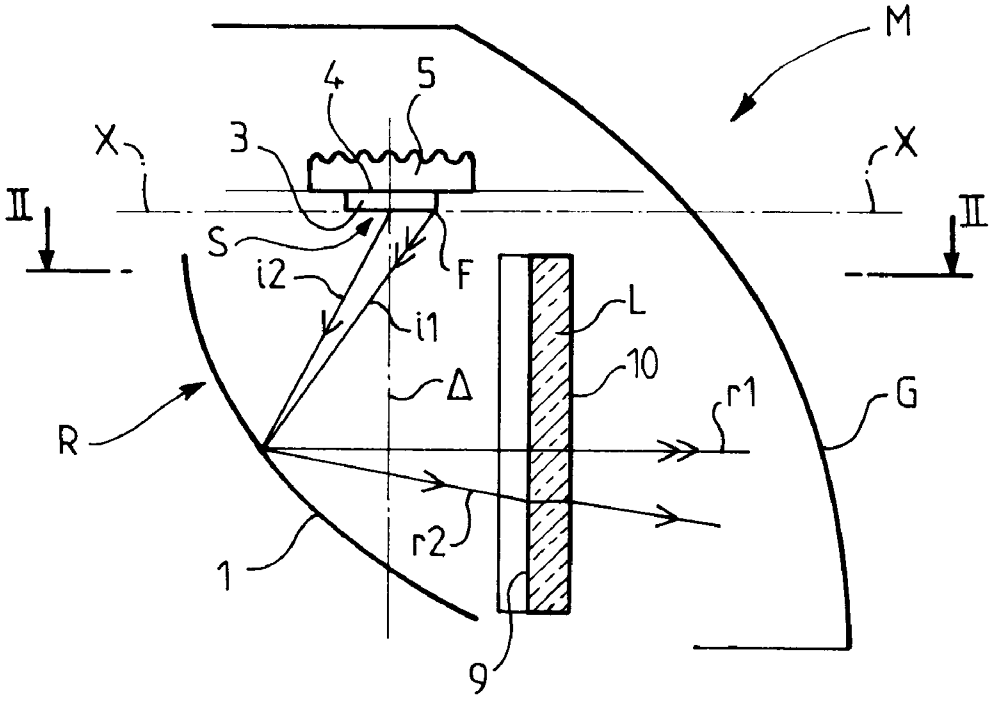
FIG. 1 is a schematic vertical section of a lighting module according to the invention.
Figure 2:
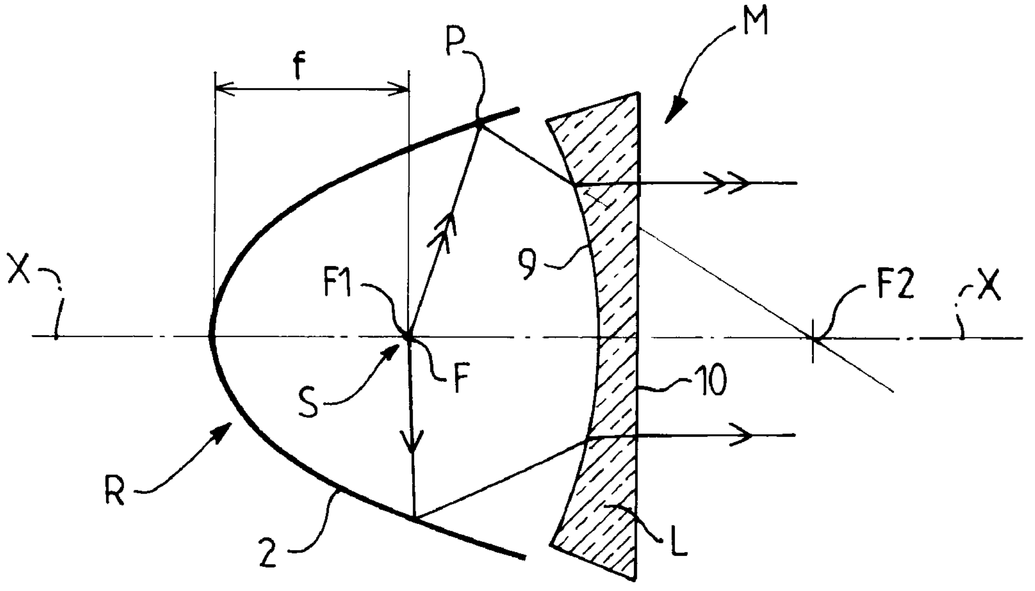
FIG. 2 is a schematic horizontal section along the line II-II in FIG. 1.

Referring to FIGS. 1 and 2 of the drawings, a lighting module M for a motor vehicle headlight can be seen, designed to give a cutoff beam, in particular a low beam. This module has a horizontal optical axis X-X and comprises at least one light source S, and a reflector R with a surface of the complex type. The geometric axis of the reflector R is merged with the optical axis X-X.

The cross sections such as arc 1 of the reflector R through vertical planes parallel to the optical axis X-X are substantially in arcs of a parabola turning their concavity towards the front, that is to say towards the right in FIG. 1. These cross sections have a focus situated in the horizontal plane passing through the optical axis X-X of the module. The arc 1 corresponds to the cross section of the reflector R through a vertical plane passing through the optical axis X-X, and has a focus F situated on this axis.

The light source S is disposed at the focus F or in its vicinity. The cross section of the reflector R through a horizontal plane passing through the optical axis is substantially in an arc of an ellipse 2 (FIG. 2) having a first focus F1 merged with the focus F or adjoining this focus, and a second focus F2 situated in front on the optical axis of the module.

The reflector R of the complex surface type produces towards the front a beam with cutoff. The cutoff may correspond to a flat line, in particular horizontal for a fog function. It can also correspond to a flat but oblique line, in particular to participate in the formation of the oblique part of a beam of the low type (which has, according to European regulations, a cutoff in the form of a broken line comprising a horizontal flat segment oblique at 15°).

A cylindrical lens L with vertical generatrices is placed between two planes passing through the foci F1 and F2 of the arc of an ellipse 2 and orthogonal to the optical axis. The lens has the general form of a divergent lens, at least one area of which may not be divergent.

According to the invention, the light source S is formed by at least light emitting diode 3, abbreviated to LED. Preferably, the emitter of the LED 3 is of the rectangular or square flat type, with sides from 1 to 5 mm. The focal distance of the reflector R is around 5 mm for such emitters. The LED 3 is disposed so as to illuminate downwards with the mean direction Δ of its light beam substantially vertical and/or orthogonal to the geometric axis of the reflector R. This reflector R is situated, in relation to the plane of the rear face 4 of the LED, entirely on the side of the beam emitted by the LED 3. In calculating the surface area of the reflector R, account is taken of the protective lens of the LED 3.

According to FIGS. 1 and 2, the front edge of the LED 3 is situated at the focus F and the LED extends towards the rear from the focus F. The collecting reflector R is such that, at each point on this reflector, light rays such as i1 issuing from the front edge of the LED 3 are reflected horizontally in a ray such as r1, or so as to define an oblique flat cutoff line rising at 15° to the horizontal. The rays such as i2 emitted by points on the LED 3 situated behind the front edge are reflected along rays such as r2 descending below the horizontal. With this arrangement, the illuminated zone is therefore situated below a horizontal cutoff or an inclined cutoff rising from the horizontal.

If it is wished to obtain a beam whose illuminated part is situated above the cutoff line with a dark part below this line, the LED 3 is then disposed so that its rear edge passes through the focus F and the LED 3 is situated in front of this focus.

A heat sink 5 for discharging the heat given off by the LED 3 is disposed against the rear face of this LED, on the opposite side to the reflector R.

The whole of the module is disposed in a housing closed at the front by a transparent lens G.

According to the embodiment in FIGS. 1 and 2, the LED 3 is disposed so that the plane of its rear face 4 is horizontal, the heat sink 5 being oriented upwards. The reflector R is situated below the horizontal plane of the rear face 4.

The cylindrical lens L, essentially divergent, can be placed at any point between the collecting reflector R and the focus F2, and makes it possible to adjust the horizontal distribution of the light in the beam.

Figure 3:
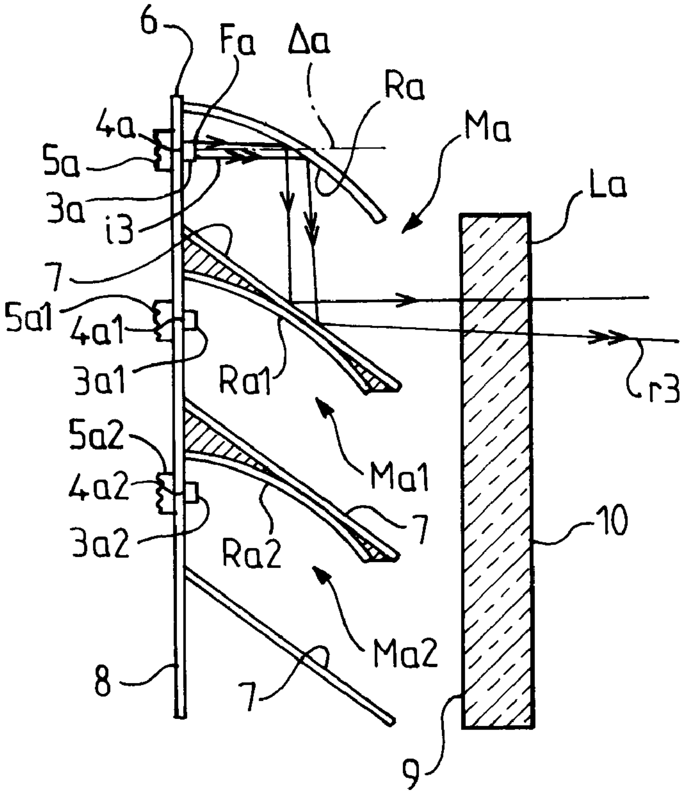
FIG. 3 is a schematic view in vertical section of a module with several light emitting diodes according to the invention.
Figure 4:
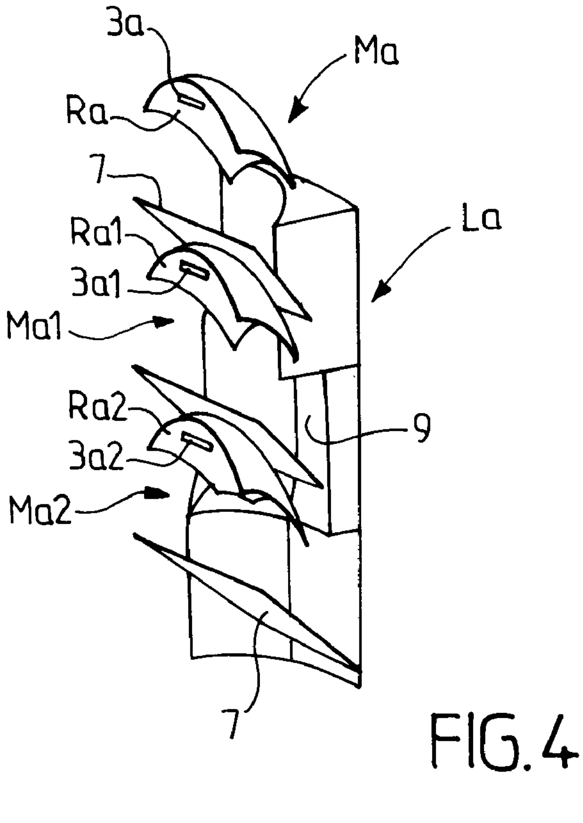
FIG. 4 is a perspective view from the rear, to a smaller scale, of a module according to FIG. 3, the rear board of the printed circuit being removed.
Figure 5:
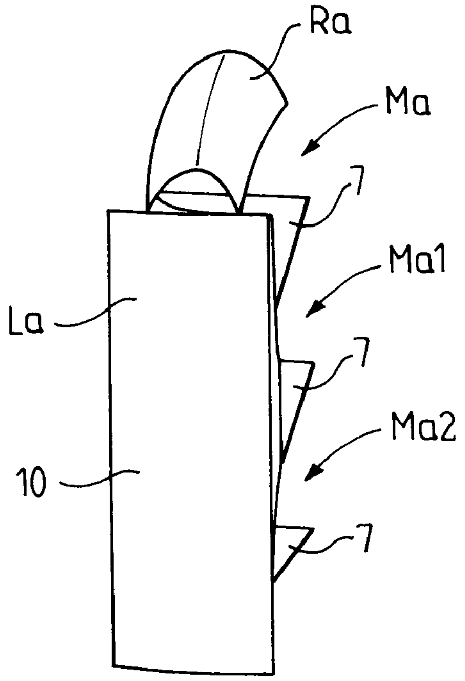
FIG. 5 is a schematic perspective front view of the module of FIG. 4.

In the variant embodiment with low cutoff of FIGS. 3-5, to improve the efficacy, the lens La, before bending of the beam, must pass beyond the reflector upwards, while in the case of FIGS. 1 and 2 the lens L must pass beyond the reflector downwards, since the beam diverges all the more, the further it is away from the reflector. On the other hand, the closer the lens L, La is to F2, the more narrow it potentially is (the width corresponds to the dimension in a direction perpendicular to the plane of FIG. 1) since the beam in plan view converges towards F2; this effect is however partly or even totally cancelled out according to the source chosen and its orientation because of the divergence due to the size of the source. However, it is desirable to keep the lens close to the reflector R in order better to control the horizontal distribution.

The module M of FIGS. 1 and 2 offers high efficiency. It makes it possible to obtain a satisfactory light flux for a reduced electrical energy consumption but does not lend itself well to vertical stacking, firstly because of the arrangement of the heat sink 5 and secondly because the LEDs will not be situated in the same plane, which prevents placing them on a single printed circuit board and complicates the electrical connections. It is however possible to juxtapose the modules horizontally, with the rear faces of the LEDs in the same horizontal plane, for mounting on a single horizontal printed circuit board.

Advantageously, to allow easy vertical stacking, as illustrated in FIG. 3, a module Ma according to the invention comprises at least one LED 3*a*, the rear face 4*a* of which is situated in a vertical plane 6 so as to emit towards the front a light beam having a substantially horizontal mean direction Δa. The heat sink 5*a* of the LED is situated behind it while the reflector Ra is situated in front of the LED with its concavity turned downwards. The geometric axis (not traced in FIG. 3) of the reflector Ra is vertical. The mean direction Δa of the beam of the LED is horizontal and therefore orthogonal to the geometric axis of the reflector Ra. A flat return mirror 7 is disposed between the reflector Ra in order to return the beam towards the lens La with vertical generatrices. The mirror 7 is inclined, preferably by 45°, to the horizontal plane.

As shown in FIG. 3 it is then possible to stack several modules vertically, for example three similar modules Ma, Ma1, Ma2 where the rear faces 4*a*, 4*a*1, 4*a*2 of the LEDs 3*a*, 3*a*1, 3*a*2 are situated in one and the same vertical plane 6 and can be fixed and connected to one and the same vertical printed circuit board 8. Heat sinks 5*a*, 5*a*1, 5*a*2 are disposed behind each respective LED; in a variant the heat sinks could be grouped together in a single common heat sink.

By virtue of the turning of the beam created by the return mirror 7, the LED 3*a* is disposed so that its top edge is substantially at the focus Fa of the reflector Ra. The light rays such as i3 coming from the areas of the LED 3*a* situated lower than the focus are reflected downwards by Ra, moving away towards the outside, and are then reflected by the mirror 7 along rays such as r3 in a descending direction. The lens La is common to the three modules and has a sufficient height for this purpose.

To fulfill a PBL function (progressive bending lighting or "progressive bending light" in English), disclosed for example in the patent EP-A-1 500 553, which is equivalent to U.S. Pat. No. 7,390,112, which is incorporated herein by reference and made a part hereof, the mean direction of the beams of the superimposed modules Ma, Ma1, Ma2 are offset angularly about a vertical axis so that, by successively switching on the modules, for example from bottom to top, the light beam turns towards the inside of the bend.

Advantageously, the flat return mirror 7 of a module is fixed to the back of the reflector Ra1, Ra2 of the module situated below and forms a single piece with this reflector. The entry face 9 of the lens La can have steps at the transition areas between the various modules whereas the exit face 10 of this lens is smooth, without steps.

In a module, or in a headlight composed of a stack of modules, according to the invention:

the lens does not have any vertical power since the lens is cylindrical of vertical axis for each module, which necessitates the cutoff of the beam being entirely effected upstream of the lens. This is indeed the case since the cutoff is achieved by means of the reflector R, Ra, Ra1, Ra2. This avoids bright lines and a discontinuous appearance of the lens;

the module or headlight has good efficacy, similar to that of modules with a bender; the close light and therefore the flux are high for a PBL function; and the LEDs, according to the variant in FIGS. 3-5, are situated on the same vertical plane and up against their heat sink, which simplifies the manufacturing process and reduces the cost.

It should be noted that, having regard to the position of the reflectors in the bent version of FIGS. 3-5 involving a flat return mirror, the corresponding modules Ma, Ma1, Ma2 must, before bending by the flat mirror, give a lower cutoff, all the light having to be situated above a horizontal line, in the reference frame of the previous figures. If for reasons of location it is decided to make the part comprising all the reflectors project below the bottom of the lens rather than above its top end, it is then necessary for the non-bent elementary system to supply, in the reference frame used, a cutoff of the low type, with all the light below the horizontal cutoff. In this case, the LEDs are situated above the collecting mirrors R, which are themselves below the return mirrors 7: an "inverted" configuration compared with that shown in the figures is obtained.

The reflectors R, Ra, Ra1, Ra2 of the "complex surface" type are adapted to the LEDs 3. This is because, in the light of the focal distances sought (around 5 mm for light emitters with sides of 1 to 5 mm), it is necessary to take account of the protective lenses of the LEDs.

Calculation of the Surface Areas of the Reflectors

1$^{st}$ case: the cross section of the LED (emitter+protective "lens") through a vertical plane passing through the focus is independent of the cutting plane in question, except for the length behind the focus of the segment representing the cross section of the emitter, or for the length in front of the focus if it is sought to obtain a cutoff of the low type rather than a high cutoff.

This case corresponds to a protective lens of the blade or plate type with parallel faces.

Under these conditions, if a straight line is considered, tangent, at a point under consideration P, to a given flat parameter curve (straight line and curve contained in a horizontal plane) and if a plane perpendicular to this straight line and passing through the focus F (which is a carefully chosen point on the emitter) is considered, it is possible to validly make a 2D optical construction in this perpendicular plane for a hypothetical reflector surface, cylindrical, having as its cross section the result of this construction and as its direction the straight line mentioned above, which is then one of the generatrices of the cylinder. This is because all the rays emitted from the focus in the construction plane remain contained therein (the result of the property on the cross sections mentioned above) and the construction is valid, in projection in the direction of the cylinder, at any point thereon.

Figure 6:
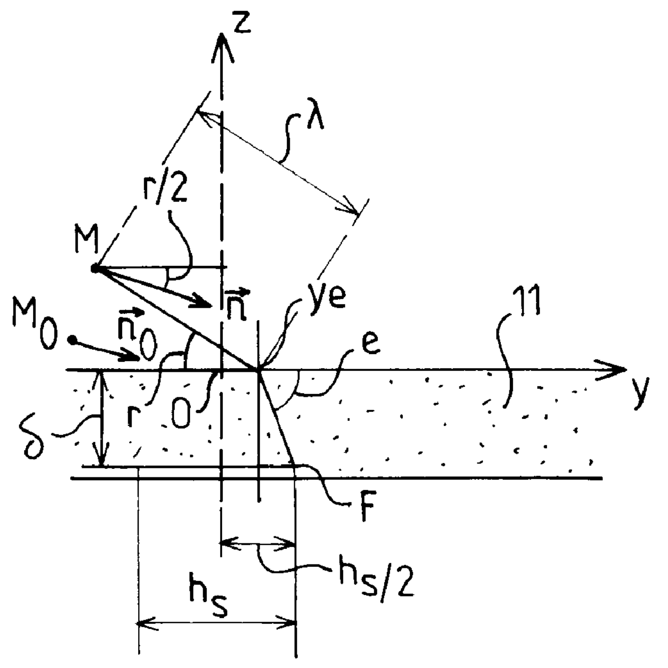
FIG. 6 is a schematic vertical section of a light emitting diode encapsulated in a protective plate made from transparent material, illustrating the calculation of the reflector.
Figure 7:
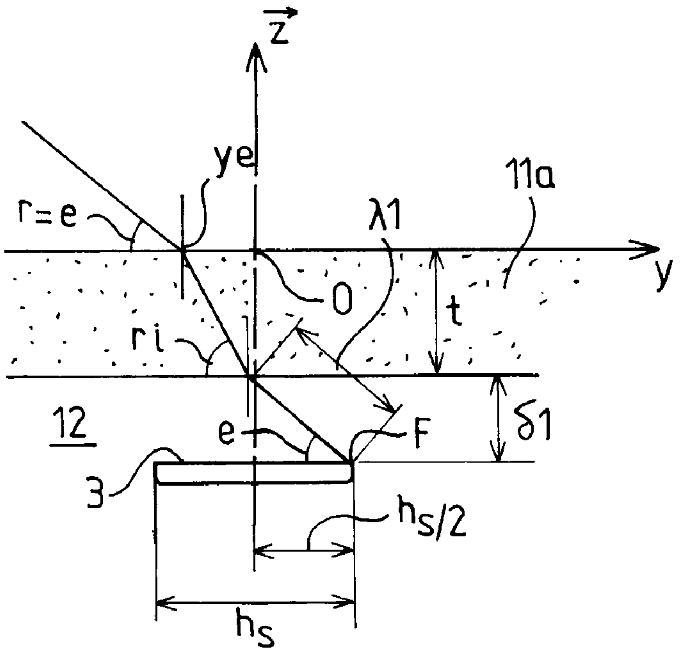
FIG. 7 is a schematic vertical section similar to FIG. 6 of a light emitting diode separated by a layer of air from the transparent protective plate, for the calculation of the reflector.

This first case corresponds to two known families of LEDs:

1a/those whose emitter is encapsulated in a protective layer of transparent material, in particular a resin, of a flat exit face (FIG. 6), and 1b/those whose emitter is simply protected by a transparent blade, in particular a glass blade, flat with a layer of air between the emitter and the blade (FIG. 7).

There is given below a method of calculating cross sections for the two families of LEDs mentioned above (1a, 1b) for a direction parallel to x (axis of the reference frame, itself parallel to one of the sides of the emitter), in the case of a low cutoff, dead zone at the top after bending and assembly. It should be noted that in this case the "focus" is the corner of the emitter situated furthest forward along the optical axis and on the opposite side along x to the part of the reflector in the course of construction—the other side can be constructed by symmetry but not necessarily with the same parameter, that is to say here the same section through z=0). The calculation method disclosed is an elementary numerical solution of the underlying equation, which is a differential equation.

Referring to FIG. 6 it can be seen that:

$h_s$=dimension of the emitter in the direction y

δ=thickness of the transparent layer above the emitter

δ1=the thickness of air between the emitter and the protective blade (as shown in FIG. 7)

e=angle of a ray issuing from the focus with the exit surface of the layer $y_e$=coordinate along y of the exit point of the ray r=angle of the ray refracted in air with exit surface of the layer $M_0$=known point on the surface of the reflector Vector $\vec{n_0}$=normal at $M_0$ to the surface of the reflector M=point to be determined on the surface of the reflector, close to $M_0$ Vector $\vec{n}$=normal at M to the surface of the reflector n=refractive index of the layer λ=length of the segment between M and the exit point of the ray.

The vector n is oriented according to the bisector of the angle between the incident ray and the horizontal.

Calculation of the Cross Section of the Reflector

1a—The case of an encapsulated LED (diagram in FIG. 6), embedded in a transparent protective plate 11 or layer:

$$y_e = \frac{hs}{2_{tan}} - \frac{\delta}{e}$$

$$n\ \sin\left(\frac{\pi}{2} - e\right) = \sin\left(\frac{\pi}{2} - r\right)$$

$$n\ \cos\ e = \cos\ r$$

$$\left(e_{min} = \text{arc}\cos\frac{1}{n}\right)$$

$$M = \begin{pmatrix} y_e - \lambda\cos r \\ \lambda\sin r \end{pmatrix}$$

$$\overrightarrow{M_o M}\ \text{perpendicular to}\ n_0 \Rightarrow$$

$$(y_e - \lambda\cos r - y_{M0})\,n_{0y} + (\lambda^{sine} r - z_{M0})n_{oz} = 0$$

$$\text{whence}\ \lambda\ \text{and}\ M$$

$$\text{Moreover}\ \vec{n} = \begin{pmatrix} \cos\frac{r}{2} \\ -\sin\frac{r}{2} \end{pmatrix}$$

1b—The case where a layer of air 12 (FIG. 7) is situated between the emitter 3 of the LED and the transparent protective plate 11*a*.

The meaning of the letters appears in FIG. 7, with:

δ1=thickness of the layer of air 12 t=thickness of the transparent plate or layer 11*a*

$$y_e = \frac{hs}{2} - \frac{\delta 1}{tan_e} - \frac{t}{tan_{r_i}}$$

$$n\cos r_i = \cos e$$

$e_{min}$ is such that $y_e$=−f (equation in e), with f the distance between F and the bottom of the mirror measured along the optical axis, as shown in FIG. 2).

The rest of the calculation is similar to the previous case.

It is then possible to calculate an appropriate tangent cylinder at any point under consideration P on the parameter curve and therefore construct the complete surface (this surface is the internal envelope—that is to say on the source side—of this infinity of cylinders). Advantageously, a cross section of each of the cylinders belonging to the envelope sought is calculated, a section through a vertical plane contained P parallel to the ray issuing from F1 after reflection at P. The cross section of the cylinder is calculated as above after projection of F and of the emitter onto a vertical plane passing through P and containing the normal to the parameter curve, generally elliptical, at P. Hs and f are then the different values for each point P.

An elliptical arc of foci F and F2 is preferably taken for the parameter curve.

It should be noted that here, by way of example, F and F1 are merged or practically merged, but this is only one example, and F and F1 may also be distinct.

Next, by calculation, the exit lens is constructed according to a horizontal deviation parameter of the images that makes it possible to control the form of the iso-illumination curves on a measuring screen and the total width of the beam. For more details, reference can be made to the construction method described in the patent EP 1 243 846, which is equivalent to U.S. Patent Publication 2002/0186570, which is incorporated herein by reference and made a part hereof.

$2^{nd}$ case—This is in particular the case of LEDs protected by a spherical dome. A 2D construction has no meaning since the normals to the protective "lens" are not contained in the construction planes (therefore the rays do not remain in the cutting plane).

The principle used consists of transforming a spherical wave issuing from a corner of the emitter (F, as above) into a spherical wave of center F2. The calculation obviously takes into account the deviations due to the protective dome (which is not centered on the focus).

The procedure is relatively simple, which stems from the fact that it is wished to make a beam with low cutoff, independently of the choice of a beam converging in plan view towards F2.

Among the advantages procured by the invention is the vertical lens L, La with smooth exit surface. In addition only three optical parts are to be assembled, namely:

all the LEDs fixed to a printed circuit board and/or a heat sink;

the reflectors, including lugs (not shown) for fixing to the heat sink and lens;

the lens.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. A lighting module for a motor vehicle headlight for giving a cutoff beam, or a low beam, said lighting module having an optical axis and comprising:

at least one light source;

a reflector of the complex surface type, said at least one light source being disposed substantially at a focus situated on said optical axis, and a cross section of said reflector through a horizontal plane being substantially in an arc of an ellipse having a first focus substantially at the focus where said at least one light source is situated, and a second focus situated in front on said optical axis of said lighting module, said reflector producing towards the front a cutoff beam; and a cylindrical lens with substantially vertical generatrices; said cylindrical lens having at least a portion that is divergent wherein said at least one light source comprises at least one light emitting diode disposed so that its light beam has a mean direction substantially orthogonal to a geometric axis of said reflector;

said reflector is situated, relative to a plane of a rear face of said at least one light emitting diode, on the emitted beam side, and in calculating its surface area account is taken of the protective optic part of said at least one light emitting diode;

wherein a return mirror is disposed generally opposite said reflector for receiving said light beam from said reflector and redirecting said light beam through said cylindrical lens.

2. The lighting module according to claim 1, wherein said at least one light emitting diode has a heat sink situated on the side opposite to said reflector.

3. The lighting module according to claim 1, wherein said at least one light emitting diode is disposed with its rear face in a horizontal plane so as to emit a light beam downwards in a substantially vertical mean direction, a heat sink of said at least one light emitting diode being situated above it, while said reflector is situated below said horizontal plane of said rear face of said at least one light emitting diode.

4. The lighting module according to claim 1, wherein said at least one light emitting diode is disposed with its rear face in a horizontal plane so as to emit a light beam upwards in a substantially vertical mean direction, a heat sink of said at least one light emitting diode being situated below this, while said reflector is situated above the said horizontal plane of said rear face of said at least one light emitting diode.

5. The lighting module according to claim 1, wherein said at least one light emitting diode is disposed with its rear face in a substantially vertical plane so as to emit a light beam having a substantially horizontal mean direction, a heat sink of said at least one light emitting diode being situated behind this, while said reflector is situated in front of said at least one light emitting diode, turned downwards, and said return mirror is disposed below said reflector in order to return said light beam towards said cylindrical lens.

6. The lighting module according to claim 1, wherein said at least one light emitting diode is disposed with its rear face in a substantially vertical plane so as to emit a light beam having a substantially horizontal mean direction, a heat sink of said at least one light emitting diode being situated behind this, while said reflector is situated in front of the said at least one light emitting diode, turned upwards, and said return mirror is disposed above said reflector in order to return said light beam towards said cylindrical lens.

7. The lighting module according to claim 5, wherein said return mirror is planar or cylindrical.

8. The lighting module according to claim 5, wherein said return mirror is inclined by approximately 45° to said horizontal plane.

9. The headlight according to claim 8, wherein said return mirror is disposed above or below said reflector of a bottom module and is adapted to form a single piece with it.

10. The lighting module according to claim 2, wherein said at least one light emitting diode is disposed with its rear face in a horizontal plane so as to emit a light beam downwards in a substantially vertical mean direction, said heat sink of said at least one light emitting diode being situated above it, while said reflector is situated below said horizontal plane of said rear face of said at least one light emitting diode.

11. The lighting module according to claim 2, wherein said at least one light emitting diode is disposed with its rear face in a horizontal plane so as to emit a light beam upwards in a substantially vertical mean direction, said heat sink of said at least one light emitting diode being situated below this, while said reflector (R) is situated above said horizontal plane of said rear face of said at least one light emitting diode.

12. The lighting module according to claim 2, wherein said at least one light emitting diode is disposed with its rear face in a substantially vertical plane so as to emit a light beam having a substantially horizontal mean direction, said heat sink of said at least one light emitting diode being situated behind this, while said reflector is situated in front of said at least one light emitting diode, turned downwards, and said return mirror is disposed below said reflector in order to return said light beam towards said cylindrical lens.

13. The lighting module according to claim 2, wherein said at least one light emitting diode is disposed with its rear face in a substantially vertical plane so as to emit a light beam having a substantially horizontal mean direction, the said heat sink of the said at least one light emitting diode being situated behind this, while said reflector is situated in front of said at least one light emitting diode, turned upwards, and said return mirror is disposed above said reflector in order to return said light beam towards said cylindrical lens.

14. The lighting module according to claim 6, wherein said return mirror is planar or cylindrical.

15. The lighting module according to claim 6, wherein said return mirror is inclined by approximately 45° to said horizontal plane.

16. A headlight for a motor vehicle, wherein said headlight comprises at least one module comprising:

at least one light source;

a reflector of the complex surface type, said at least one light source being disposed substantially at a focus situated on an optical axis, and a cross section of said reflector through a horizontal plane being substantially in an arc of an ellipse having a first focus substantially at the focus where said at least one light source is situated, and a second focus situated in front on said optical axis of said at least one module, the said reflector producing towards the front a cutoff beam; and a cylindrical lens with substantially vertical generatrices; said cylindrical lens having at least a portion that is divergent wherein said at least one light source comprises at least one light emitting diode disposed so that its light beam has a mean direction substantially orthogonal to a geometric axis of said reflector;

said reflector is situated, relative to a plane of a rear face of said at least one light emitting diode, on the emitted beam side, and in calculating its surface area account is taken of the protective optic part of said at least one light emitting diode;

wherein a return mirror is disposed generally opposite said reflector for receiving said light beam from said reflector and redirecting said light beam through said cylindrical lens.

17. The headlight for a motor vehicle, according to claim 16, wherein said headlight comprises several modules wherein said modules are juxtaposed or stacked with rear faces of said at least one light emitting diode situated in one and the same plane.

18. The headlight according to claim 17, wherein said modules are stacked and have beams offset angularly, in horizontal projection, from bottom to top and are switched on successively according to a turning of vehicle wheels in order to obtain progressive bending lighting.

19. The headlight according to claim 16, wherein said headlight comprises three or four stacked modules with beams offset angularly.

20. The headlight according to claim 17, wherein said return mirror is disposed above or below said reflector of a bottom module and is adapted to form a single piece with it.

* * * * *

UNITED STATES PATENT AND TRADEMARK OFFICE

CERTIFICATE OF CORRECTION

PATENT NO. : 7,980,742 B2
APPLICATION NO. : 12/178825
DATED : July 19, 2011
INVENTOR(S) : Pierre Albou It is certified that error appears in the above-identified patent and that said Letters Patent is hereby corrected as shown below:

In Column 9, Line 27, please delete “the” after the word above.

In Column 9, Line 42, please delete “the” after the word of.

In Column 10, Line 13, please delete “the” after the word direction.

In Column 10, Line 14, please delete “the” after the word of.

In Column 10, Line 33, please delete “the” after the word module.

Signed and Sealed this
Fifth Day of June, 2012

David J. Kappos
*Director of the United States Patent and Trademark Office*